350-96.1 SR
XR 3,534,159

Oct. 13, 1 3,534,159

SINGLE PICKUP TUBE COLOR TELEVISION CAMERA SYSTEM

Filed Oct. 30, 1968

INVENTOR
R. L. EILENBERGER
BY John K. Mulkerney
ATTORNEY

3534159
OR IN 358/49

United States Patent Office 3,534,159
Patented Oct. 13, 1970

3,534,159

SINGLE PICKUP TUBE COLOR TELEVISION CAMERA SYSTEM

Robert L. Eilenberger, Colts Neck Township, Monmouth County, N.J., assignor to Bell Telephone Laboratories, Incorporated, Murray Hill, N.J., a corporation of New York Filed Oct. 30, 1968, Ser. No. 771,784
Int. Cl. H04n *9/06*
U.S. Cl. 178—5.4 8 Claims

ABSTRACT OF THE DISCLOSURE

A color separating optical prism assembly comprises a plurality of prisms bonded together in abutting relationship so as to form a pair of crossed diagonal planes through the assembly. Selected dichroic layers are disposed on said diagonal planes and on a pair of exterior surfaces of the prism assembly which are parallel to the diagonal planes. In this manner, three separate, closely spaced, color-distinct, parallel light paths are established. The prism assembly is, in turn, bonded to a composite faceplate of a video camera tube. The faceplate is composed of two sections of fiber optic material separated by an intermediate section of prism-type material.

BACKGROUND OF THE INVENTION

This invention relates to color television camera systems and more particularly to a multiple image/single pickup tube color television camera system.

In deriving the several signals necessary for color television transmission, the typical practice has been to extract from the light coming through the camera lenses the primary light colors (e.g., red, blue and green) of the scene to be televised. Separate primary color images are then formed at individual color camera pickup tubes. In addition to the known technical difficulties of systems of this nature, the cost alone is formidable—particularly so if the three color cameras are image-orthicon tubes.

Accordingly, it is a primary object of the present invention to provide a single pickup tube color television camera system.

A related object is to provide a color television camera assembly which is simple in construction, of relatively low cost, yet highly efficient in operation.

Single pickup tube color television camera arrangements have been proposed heretofore (see, for example, the patent to J. M. Sherman et al., No. 2,658,103, issued Nov. 3, 1953). The known prior art arrangements, however, appear to suffer in one or more respects. Typically, they use color filters which pass the desired color components and absorb the others. Color separation is thus achieved, but unfortunately this approach is quite inefficient, i.e., there is an appreciable loss of light. Other proposed arrangements, by their nature, incorporate multiple air/glass boundaries and hence these also are rather inefficient and reduce contrast.

The use of dichroic interference layers for color separation purposes has been proposed heretofore (see patent to L. T. Sachtleben et al., 2,672,072, issued Mar. 16, 1954). Such systems, using dichroic materials deposited upon substrates typically composed of plane parallel glass plates inclined at a preferred angle to the principal axis, are generally more efficient than those using color filters for color separation purposes. Here again, however, the proposed systems suffer in one or more of the above respects, and the problems of astigmatism, coma, "ghost" images, et cetera are bothersome, unless additional corrective optical elements are incorporated into the system. The inclusion of such corrective elements, however, makes the system excessively large and introduces additional glass/air boundaries.

It is accordingly a specific object of the present invention to provide a color separating optical assembly for a single pickup tube color television camera system utilizing dichroic interference layers with closely spaced parallel exit paths which result in geometrically identical, distinct, distortionless, images in line, each of small dimension, all in focus in the same plane, with plane parallel entrance and exit faces normal to the several optical paths, and with a minimum of air/glass boundaries.

In connection with the problem of light efficiency it will be appreciated by those in the art that a color separating optical assembly should preferably be such as to accommodate the use of a lens or lens system of small *f*-number. The smaller this *f*-number, of course, the larger the lens aperture and hence the greater the degree of image illumination. The prior art color separating assemblies have, typically, been of considerable size thus necessitating a lens of substantial back focal length and hence large *f*-number.

It is accordingly a further object of the present invention to provide a color separating optical assembly that is entirely compatible with a lens system of small *f*-number.

SUMMARY OF THE INVENTION

In accordance with the present invention, a single pickup tube color television camera system comprises a prism assembly of at least four prisms, with each of the latter having at least one right angle. The four prisms are bonded together in abutting relationship with the right angles thereof disposed about a common vertex so as to form a pair of crossed diagonal planes. The prism assembly is positioned in the path of incident light rays with the diagonal planes or surfaces thereof disposed to deflect selected portions of the incident light at right angles to the path of travel. To this end, the diagonal surfaces are respectively coated with blue-reflective and red-reflective dichroic materials. A pair of symmetrically disposed exterior surfaces of the prism assembly, parallel to the pair of diagonal surfaces, are respectively coated with complementary blue-reflective and red-reflective dichroic materials so as to form distinct blue and red light paths parallel to the unreflected, green, light path. The prism assembly has a planar exit face or surface which is secured in abutment against a composite faceplate of a video camera tube. The faceplate is composed of two sections of fiber optic material separated by an intermediate section of material similar to that of the prisms. The fiber optic sections serve to transfer blue and red images to the rear of the faceplate, while the intermediate section lengthens the path of the unreflected light so as to equal that of the reflected light.

DETAILED DESCRIPTION

Figure 1:
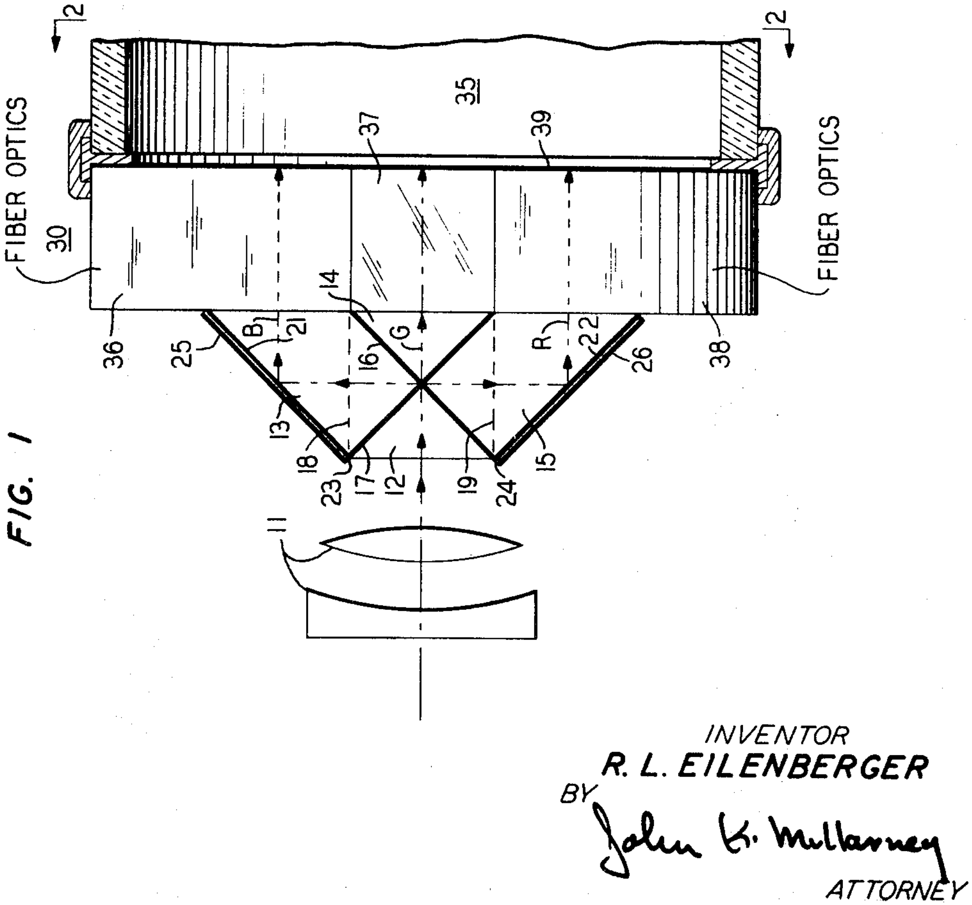
FIG. 1 is a diagrammatic representation of a color separating optical assembly for a single pickup tube color television camera system in accordance with the present invention.

Referring now to FIG. 1 of the drawings, the light from an object scene passes through an object lens system 11 to the optical prism assembly constructed in accordance with the principles of the present invention. The lens system, symbolically illustrated by lenses 11, preferably comprises a retrofocus telephoto lens, such as that made by Angénieux and others. The present invention, however, is in no way limited to such a lens system and other lenses may be advantageously utilized in conjunction with the present invention. Another lens approach, for example, is to use a normal objective to form an image in the plane of a format shaping aperture, with image transfer then carried out by means of a relay lens.

The color separating optical prism assembly of the invention comprises four prisms 12, 13, 14 and 15, each of which has at least one right angle. The four prisms are cemented together in abutting relationship, as shown in FIG. 1, with the right angles thereof disposed about a common vertex so as to form a pair of crossed diagonal planes 16 and 17 which intersect at said vertex. The prism assembly, as illustrated in FIG. 1 comprises a pair of quadrilateral prisms 13 and 15 and a pair of typical right angle prisms 12 and 14. The quadrilateral prisms 13 and 15 may each comprise a single integral block or, alternatively, each can be composed of a pair of right angle, triangular prisms as indicated by the dotted lines 18 and 19. Again, alternatively, the prisms 12 and 13 may initially comprise portions of an integral quadrangular prism which is sliced or cut along the diagonal 17 to provide the two separate prisms 12 and 13. In any event, all that is really significant in this regard is the end result, namely, an integral prism assembly having crossed diagonal planes therethrough, as shown in FIG. 1.

Prior to the prisms being cemented together, the surfaces forming the diagonal planes are appropriately coated with dichroic materials so as to selectively reflect distinct color components of the spectrum. A dichroic reflector in an optical system can be defined as one which will reflect light of a certain selected frequency or band of frequencies while transmitting light of other frequencies. The detailed theory and operation of dichroic reflectors is shown and described in a paper by G. L. Dimmick entitled "A New Dichroic Reflector and Its Application to Photo Cell Monitoring Ssystems," appearing in the Journal of the Society of Motion Picture Engineers, vol. 38, January 1942, beginning on page 36.

For purposes of explanation of the invention it will be assumed that blue-reflective dichroic material is deposited along diagonal plane 16 and red-reflective dichroic material is deposited along diagonal plane 17. Either dichroic can, however, be deposited along either plane, the operation or optical action is completely symmertical in this regard. The deposition is simply one of coating either of the prism surfaces forming a diagonal.

A red, blue and green primary color system is the one most often encountered in this art. However, other color systems have been propased heretofore—such as cyan, yellow and magenta. Accordingly, while the description of the invention will proceed on the basis of a red, blue and green color separating optical assembly, the principles of the invention are in no way limited thereto. All that is necessary to adapt the invention to a three color system other than red, blue and green is that the dichroic reflective materials be changed accordingly.

The prism assembly is positioned in the path of the incident radiant energy with the diagonal planes or surfaces 16 and 17 disposed to deflect selected portion of the incident energy, i.e., blue and red light respectively, at right angles to the path of travel, as depicted in FIG. 1. The comon vertex or point of intersection of the diagonal planes is at the optical axis of the incident light.

As shown by way of example in FIG. 1 the blue light in the spectrum of the incident energy is deflected, at right angles, in the upward direction through the prism 13; the red light in the spectrum is similarly deflected at right angles, in the downward direction through the prism 15. The light remaining, which is essentially green, passes through the dichroic layers and into prism 14.

The prisms 12, 13, 14 and 15 are cemented together in abutting relationship and the complete prism assembly is fixedly secured in abutment against the faceplate of a video camera tube, as will be described in detail hereinafter; there are accordingly no intervening air spaces between the entrance and exit faces or surfaces of the prism/faceplate assembly. The exterior surface 21 of prism 13 is parallel to the diagonal plane 16. Likewise, the exterior surface 22 of prism 15 is parallel to the diagonal plane 17. The surfaces 21 and 22 are respectively coated with blue-reflective and red-reflective dichroic materials. Thus, the blue light rays reflected at diagonal plane 16 are once again reflected, at right angles, at surface 21, as illustrated in FIG. 1. Similarly, the red light rays reflected at diagonal plane 17 are reflected, at right angles, at surface 22. In this fashion, three separate color-distinct, colsely spaced, parallel light paths are formed.

The blue-reflectivity of the dichroic layer of surface 21 is complementary to that of the blue-reflective plane or surface 16, and the red-reflective surface 22 is likewise complementary to the red-reflective surface 17. That is, the cascaded dichroics are of selectively different spectral characteristics so as to complement each other and provide the desired overall spectral bandpass characteristic. For example, the complementary blue channel dichroic reflector 21 takes care of the fact that the primary blue-reflector characteristic which shapes the transmission of the short wavelength side of the green typically leaves much to wide a spectral transmission for the blue channel. The complementary blue channel reflector is, therefore, designed to shape the long wavelength side of the blue channel to the desired characteristics. Similarly, for the red channel.

The plates 23 and 24, of material similar to that of the prisms, are cemented to the prisms 13 and 15, as shown in FIG. 1, to eliminate the air/glass boundaries at surfaces 21 and 22. The rear or outer surface of plates 23 and 24 are first "frosted" by sand-blasting and the like and then coated with a non-reflective coating such as flat black optical paint. Thus, unwanted light (i.e. other than the desired reflected blue and red) is absorbed. The plates 23 and 24 are relatively thin (e.g. .010") and since they do not lie in the optical paths they need not be of a precision made nature. Instead of the preferred arrangement of coated plates right angle prisms can also be used, see my copending application noted below.

The prism assembly, illustrated in FIG. 1, is optically and structurally symmetrical about the optical axis and hence the path lengths of the blue and red channels are equal. The prism assembly has plane parallel entrance and exit faces normal to the several light paths; this serves to eliminate image distortion due to astigmatism and the like.

The prisms are preferably all made of the same type optical glass, or the equivalent, and thus all have the same index of refraction; the same is true of the intermediate section of the camera tube faceplate to be described hereinafter. For ease in explanation, the dichroic layers have typically been described as being coated on a given surface. However, as will be evident, when a dichroic layer is located between a pair of parallel abutting surfaces it can, in fact, be coated on either of said surfaces.

A particularly advantageous feature of the color separating optical prism assembly of the present invention is that it permits the use of a lens system 11 of relatively small *f*-number. As will be appreciated by those in the art, the smaller this *f*-number, the larger the lens aperture and thus the greater the degree of image illumination. By way of example, the instant prism assembly can be compared to that disclosed in my copending application No. 763,839 filed Sept. 30, 1968. It should be immediately apparent, on comparison, that the instant prism assembly presents a path length to the incident light that is considerably less than that offered by the prism assembly of the copending case. In fact, the path length is one third shorter. Accordingly, a correspondingly shorter focal length lens can be utilized. Now the *f*-number N of a lens is defined as the ratio of the focal length to the aperture diameter, and the image illumination E is given as:

$$E=\frac{t\pi B}{4N^2}$$

where $t$ is the transmittance of the lens, B is the luminance of the source and N is the $f$-number. Thus, a given reduction in focal length results in a corresponding reduction in $f$-number and, consequently, an increase in image illumination which is inversely related to the square of the $f$-number. In the present example, image illumination is increased by an order of two. Stated somewhat more graphically, the usable incident or incoming radiant energy is increased by a factor of two. And this may perhaps be more readily envisioned in terms of a larger lens aperture, which follows from the use of a lens of smaller $f$-number. In summary, the instant color separating prism assembly provides three separate, color-distinct, closely spaced, parallel light paths, while presenting the very shortest possible path length to the incident radiant energy.

The integral prism assembly is placed in abutment against the outer surface of the faceplate 30 of the camera tube 35, as illustrated in FIG. 1. The prism assembly can be cemented to the faceplate or, alternatively, it may be fixedly secured in abutment thereto by any suitable clamping arrangement. The faceplate is composed of two similar sections 36 and 38 of fiber optic material separated by an intermediate section 37 of material (i.e., optical glass) similar to that of the prisms.

As is known to those in the art, a block of fiber optic material comprises a multitude of tightly packed, aligned, slender fibers, of glass or the equivalent, held together in a preferably dark cladding; such material is made by the Corning Glass Works, and others. In a preferred embodiment, the individual fibers were of substantially square cross-section to provide a higher packing fraction, approximately six microns on a side, and of glass with preferably the same index of refraction as the prism glass. The fibers function as individual "light pipes" and serve to transfer the light incident at one end thereof to the remote end. This transfer of light images from one plane to a remote one is a known and widely used function of fiber optic blocks. The image transfer is essentially free of distortion and, as should be noted, contributes no path lengthening effect such as is inherent with homogeneous glass blocks as a result of the refraction of incident light. It is this latter feature which is advantageously utilized herein. Thus, the blue and red images focused on the outer surface of the faceplate 30 are transferred by the fiber optic sections 36 and 38 to the inner photoconductive surface 39 of the camera tube 35, with no change in image size and with no defocusing.

Figure 2:
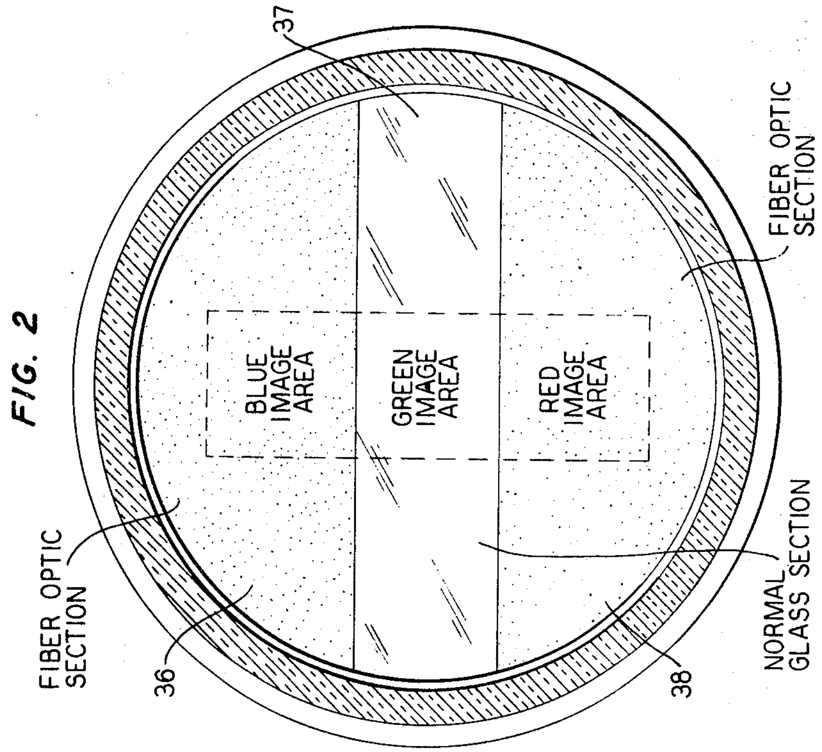
FIG. 2 is a view taken on the line 2—2 of FIG. 1.

The normal glass section 37, cemented or fused between the fiber optic sections 36 and 38, lies in the path of the unreflected light, i.e., green. The glass section 37 provides a path-lengthening function and hence its thickness (i.e., the dimension in the direction of light travel) should be such as to achieve path length equalization of all three paths. That is, this thickness must equal the difference in path length between that of the reflected light and that of the unreflected light. The thickness of the fiber optic sections is immaterial, since no path lengthening is involved, and, therefore, the faceplate can be of uniform thickness. Thus, three separate, closely spaced, color-distinct images are presented at the photoconductive surface 39 of the camera tube with the images in line, as shown in FIG. 2, all in focus in the same plane. The images are each of approximately 0.220″ dimension.

With the exception of the faceplate, the camera tube can be similar to the vidicon tubes used in visual telephone sets, but, of course, the invention is in no way limited thereto. Instead of the typical photoconductive surface used in the conventional vidicon tube, a matrix of silicon diodes can be utilized as the photoactive surface; see, for example, the patent application of T. M. Buck, M. H. Crowell, E. I. Gordon, Ser. No. 605,715, filed Dec. 29, 1966. The active surface of the vidicon, photoconductive or silicon diodes as the case may be, is scanned sequentially to generate the requisite video television signals for transmission to a remote location.

The multiple image/single pickup tube color television camera system described is of particular utility in a color video telephone station set, where the impracticality of more than one pickup tube is obvious.

While for the purpose of illustrating and describing the present invention a particular embodiment has been shown and described, it is to be understood that this embodiment is capable of such modifications as may be commensurate with the spirit and scope of the invention set forth in the following claims.

What is claimed is:

1. In a single pickup tube color television camera system, a prism assembly comprising four prisms each of which has at least one right angle, said four prisms being bonded together in abutting relationship with the right angles thereof disposed about a common vertex so as to form a pair of crossed diagonal planes which intersect at said vertex, said prism assembly adapted to be positioned in the path of incident light rays with the diagonal planes thereof disposed to deflect selected portions of the incident light at right angles to the path of light travel and with the point of intersection of said diagonal planes at the optical axis of the incident light, a pair of selected dichroic layers respectively contiguous with said diagonal planes and serving to reflect distinct color components of the visible spectrum, said prism assembly having a pair of symmetrically disposed exterior surfaces which are respectively parallel to said diagonal planes, a second pair of dichroic layers respectively contiguous to said exterior surfaces and having reflectivities which complement the reflectivities of the dichroic layers parallel thereto, said prism assembly further having a pair of exterior plane parallel entrance and exit surfaces normal to the aforementioned optical axis, and a composite camera tube faceplate secured in abutment against the exit surface of the prism assembly, said faceplate composed of two sections of fiber optic material separated by an intermediate section of material similar to that of the prisms, said fiber optic sections serving to respectively transfer the reflected light images to the rear surface of the faceplate and said intermediate section serving to lengthen the path of the unreflected light so as to equal that of the reflected light.

2. A color camera system as defined in claim 1 wherein the prisms and the intermediate section of said faceplate are made of the same type optical glass.

3. A color camera system as defined in claim 2 wherein all intervening air-to-glass boundaries between the entrance and exit faces of the prism assembly are eliminated.

4. A color camera system as defined in claim 3 wherein glass means are seletively cemented to the integral prism assembly to eliminate the air-to-glass boundaries at said second pair of dichroic layers.

5. A color camera system as defined in claim 4 wherein said glass means each comprises a thin plate with the exterior surface thereof frosted and coated with a non-reflective coating.

6. A color camera system as defined in claim 5 wherein the first pair of dichroic layers serve to respectively reflect blue and red light rays, while passing green light rays.

7. A color camera system as defined in claim 6 wherein said fiber optic material is of the same index of refraction as said prism glass.

8. A color separating optical prism assembly adaptable for use with a lens system of small $f$-number comprising four prisms each of which has at least one right angle, said four prisms being bonded together in abutting relationship with the right angles thereof disposed about a common vertex so as to form a pair of crossed diagonal planes which intersect at said vertex, said prism assembly adapted to be positioned in the path of incidnet light rays with the diagonal planes thereof disposed to deflect selected portions of the incident light at right angles to the path of light travel and with the point of intersection of said diagonal planes at the optical axis of the nicident light, a pair of selected dichroic layers respectively contiguous with said diagonal planes and serving to reflect distinct color components of the visible spectrum, said prism assembly having a pair of symmetrically disposed exterior surfaces which are respectively parallel to said diagonal planes, a second pair of dichroic layers respectively contiguous to said exterior surfaces and having reflectivities which complement the reflectivities of the dichroic layers parallel thereto, said prism assembly further having a pair of exterior plane parallel entrance and exit surfaces normal to the aforementioned optical axis.

References Cited

UNITED STATES PATENTS

| | | | |
|---|---|---|---|
| 2,552,404 | 5/1951 | Siezen. | |
| 3,060,789 | 10/1962 | Hicks. | |
| 3,202,039 | 8/1965 | De Lang et al. | 350—173 |

RICHARD MURRAY, Primary Examiner

R. P. LANGE, Assistant Examiner

U.S. Cl. X.R.

178—6, 7.2; 313—110, 111; 350—96